United States Patent [19]

Elbs et al.

[11] Patent Number: 4,642,211
[45] Date of Patent: Feb. 10, 1987

[54] PREPARATION OF DRY POLYCAPROLACTAM GRANULES

[75] Inventors: Peter Elbs, Otterstadt; Wolfgang-Dieter Jeserich, Frankenthal; Rudolf Wehr, Wachenheim, all of Fed. Rep. of Germany

[73] Assignee: BASF Aktiengesellschaft, Fed. Rep. of Germany

[21] Appl. No.: 662,558

[22] Filed: Oct. 19, 1984

[30] Foreign Application Priority Data

Oct. 21, 1983 [DE] Fed. Rep. of Germany ....... 3338294

[51] Int. Cl.[4] ............................................. B29C 47/88
[52] U.S. Cl. ..................................... 264/85; 264/143; 264/178 F; 264/235; 264/331.19; 264/346
[58] Field of Search ............................. 264/85, 140–144, 264/178 F, 178 R, 331.19, 234, 235, 345, 346

[56] References Cited

U.S. PATENT DOCUMENTS

| | | | |
|---|---|---|---|
| 2,289,774 | 7/1942 | Graves | 264/141 |
| 2,834,053 | 5/1958 | Bilanin et al. | 264/178 R |
| 2,859,479 | 11/1958 | Eckardt | 264/178 R |
| 2,880,057 | 3/1959 | Cuculo | 264/178 F |
| 2,943,350 | 7/1960 | Rodenacker | 264/85 |
| 2,975,483 | 3/1961 | Cooper et al. | 264/143 |
| 2,976,572 | 3/1961 | Kessler | 264/178 F |
| 3,032,821 | 5/1962 | De Booys et al. | 264/143 |
| 3,753,661 | 8/1973 | Simons | 264/85 |
| 4,508,675 | 4/1985 | Salatiello et al. | 264/85 |

FOREIGN PATENT DOCUMENTS

| | | | |
|---|---|---|---|
| 50-36461 | 11/1975 | Japan | 264/85 |
| 1548179 | 7/1979 | United Kingdom . | |

*Primary Examiner*—Jeffery Thurlow
*Attorney, Agent, or Firm*—Keil & Weinkauf

[57] ABSTRACT

Dry polycaprolactam granules containing from 8 to 13% by weight of caprolactam and its oligomers are prepared by a method in which a caprolactam melt is extruded, the extrudates are cooled to 100°–150° C., left at this temperature until the polycaprolactam has substantially crystallized, and then immediately granulated, and the granules are left in a stream of inert gas, in the absence of molecular oxygen, for from 1 to 4 hours at from 100° to 150° C., and are then cooled.

5 Claims, No Drawings

PREPARATION OF DRY POLYCAPROLACTAM GRANULES

The present invention relates to a process for the preparation of dry polycaprolactam granules containing from 8 to 13% by weight of caprolactam and its oligomers, wherein the polycaprolactam melt containing the stated amount of caprolactam and its oligomers is extruded, the extrudates are cooled and granulated, and the granules are treated with an inert gas at elevated temperatures.

In the preparation of polycaprolactam by hydrolytic polymerization of caprolactam by a conventional process, for example in a precondensation tube, polycaprolactam containing about 11% by weight of monomeric caprolactam and caprolactam oligomers is obtained, depending on the polymerization equilibrium. Usually, this melt is extruded, and the extrudates are cooled to below 50° C. in a water bath and are then granulated. The granules containing monomers and oligomers are then extracted with water and dried.

However, for special fields of use, it is desirable to use polycaprolactam with the initial content of caprolactam and its oligomers. When an attempt is made to dry the granules obtained as described above, caking takes place. It is known that polycaprolactam granules can be treated at elevated temperatures with an inert gas in order to effect solid-phase condensation. In order to avoid caking, it is also advisable in this case to use extracted granules and to introduce additional agents which prevent caking.

It is an object of the present invention to provide dry polycaprolactam granules which contain from 8 to 13% by weight of caprolactam and its oligomers and which do not cake.

We have found that this object is achieved by a process for the preparation of dry polycaprolactam granules containing from 8 to 13% by weight of caprolactam and its oligomers, in which a polycaprolactam melt containing the stated amount of caprolactam and its oligomers is extruded, the extrudates are cooled and granulated, and the granules are treated with an inert gas at elevated temperatures, wherein the extrudates are cooled to 100°-150° C., left at this temperature until the polycaprolactam has substantially crystallized, and then immediately granulated, and the granules are left in a stream of inert gas, in the absence of molecular oxygen, for from 1 to 4 hours at from 100° to 150° C., and are then cooled.

The novel process has the advantage that, when the polycaprolactam granules are dried, caking does not take place although the granules have a high content of monomers and oligomers. Another advantage of the novel process is that the heat energy present in the polycaprolactam granules is used for the drying procedure. The novel process is remarkable in that the granulation of nylon extrudates at above 100° C. was expected to present difficulties, and furthermore caking was to be expected during drying.

The polycaprolactam melt is prepared in a conventional manner by hydrolytic polymerization of caprolactam at from 240° to 300° C. in a polymerization tube, ie. a precondensation tube. Such a melt usually contains about 8-13% by weight of caprolactam and its oligomers, depending on the temperature in the equilibrium state. This melt is converted to extrudates having a diameter of, for example, from 1 to 3 mm, extrusion advantageously being carried out at from 220° to 280° C. As a rule, the extrudates obtained in this manner are drawn at a rate of from 30 to 180 m/min, cooled to 100°-150° C. and left at this temperature until the polycaprolactam has substantially crystallized.

Advantageously, the still molten, freshly extruded polycaprolactam extrudates are brought into contact with water at, for example, 15°-50° C. for a short time, and are cooled to 100°-150° C. in this manner. As a rule, the extrudates need be brought into contact with water for only a few, eg. from 0.5 to 5, seconds. Thereafter, the extrudates cooled in this manner are passed through the ambient air without further cooling, ie. at from 100° to 150° C., until the polycaprolactam has substantially crystallized. This, too, requires only a few, eg. from 2 to 20, seconds.

The polycaprolactam extrudates substantially crystallized in this manner are immediately granulated in a conventional manner, and the granules are transferred to a drying zone where they are left in a stream of inert gas, eg. nitrogen, in the absence of molecular oxygen for from 1 to 4 hours at from 100° to 150° C., in particular from 125° to 150° C. The granules are then cooled, and are introduced into containers in the usual manner.

The resulting polycaprolactam granules contain from 8 to 13% by weight of caprolactam and its oligomers and from 0.02 to 0.10% by weight of water. Granules prepared in this manner are useful for producing plasticized nylon articles, for example fishing lines, yarn for fishing nets and flexible tubes.

The Examples which follow illustrate the process according to the invention.

EXAMPLE 1

Nylon 6 having a relative viscosity of 3.1 (1 g in 100 ml of 96% strength sulfuric acid) and containing 11.0% of extractables (9.4% of caprolactam and 1.6% of cyclic oligomers of caprolactam) is extruded at 280° C., and the extrudates are passed for a distance of 2 meters through a water bath at 35° C. (residence time 2 seconds) and then for a distance of 6 meters through air at 22°-28° C. (residence time 6 seconds), and are then granulated.

The temperature of the granules is 110° C., and their water content is from 0.15 to 0.20%. The hot granules fall directly into a shaft drier, which is flushed with nitrogen in order to exclude oxygen and to remove the water released. The granules are removed continuously from the drier, and are cooled, the residence time of the granules in the drier being 4 hours. The nylon 6 has a relative viscosity (1 g in 100 ml of strength sulfuric acid) of 3.1 and contains 10.9% of extractables (9.3% of caprolactam and 1.6% of cyclic oligomers of caprolactam), and the water content is from 0.04 to 0.06%.

EXAMPLE 2

The dependence of the residual water content of nylon 6 containing extractables and prepared by Example 1 on the residence time and temperature in the drier is as follows:

| Residence time in hours | 100° C. Water content | Temperature 125° C. in % | 150° C. |
|---|---|---|---|
| 1 | 0.14 | 0.11 | 0.03 |
| 2 | 0.10 | 0.04 | 0.02 |
| 4 | 0.07 | 0.02 | — |
| 5 | 0.04 | — | — |

-continued

| Residence time in hours | 100° C. Water content | Temperature 125° C. in % | 150° C. |
|---|---|---|---|
| 6 | 0.03 | — | — |
| 8 | 0.02 | — | — |

EXAMPLE 3

Nylon having a relative viscosity of 2.7 (1 g in 100 ml of 96% strength sulfuric acid) and containing 11.8% of extractables (10.4% of caprolactam and 1.4% of cyclic oligomers of caprolactam) is treated as described in Example 1. The dried nylon 6 has a relative viscosity (1 g in 100 ml of 96% strength sulfuric acid) of 2.7 and contains 11.6% of extractables (10.2% of caprolactam and 1.4% of cyclic oligomers bf caprolactam), and the water content is from 0.03 to 0.05%.

We claim:

1. A process for the preparation of dry polycaprolactam granules containing from 8 to 13% by weight of caprolactam and its oligomers which comprises: extruding a polycaprolactam melt containing the stated amount of caprolactam and its oligomers, cooling the extrudates to 100°–150° C., maintaining the extrudates at this temperature until the polycaprolactam has substantially crystallized, and then immediately granulating the extrudates, and maintaining the granules in a stream of inert gas, in the absence of molecular oxygen, for from 1 to 4 hours at from 100° to 150° C., and cooling the granules.

2. The process of claim 1, wherein the extrudates are cooled to 100°–150° C. by being brought into contact with water for a short time, and are then left in the air at this temperature until the polycaprolactam has substantially crystallized.

3. The process of claim 1, wherein the extrudates are brought into contact with water for from 0.5 to 5 seconds, after which the polycaprolactam is substantially crystallized in the course of from 2 to 20 seconds in air at from 100°–150° C.

4. The process of claim 1, wherein the inert gas used contains less than 10 ppm of molecular oxygen.

5. The process of claim 1, wherein the granules are left in a stream of inert gas at from 125° to 150° C.

* * * * *